US012038162B1

(12) United States Patent
Evans et al.

(10) Patent No.: US 12,038,162 B1
(45) Date of Patent: Jul. 16, 2024

(54) TASK LIGHTING APPARATUS

(71) Applicant: Research and Development Solutions Inc., McLean, VA (US)

(72) Inventors: John C. L. Evans, Lyme, CT (US); Christopher P. Conklin, North Providence, RI (US)

(73) Assignee: Research and Development Solutions Inc., McLean, VA (US)

( * ) Notice: Subject to any disclaimer, the term of this patent is extended or adjusted under 35 U.S.C. 154(b) by 0 days.

(21) Appl. No.: 18/209,656

(22) Filed: Jun. 14, 2023

(51) Int. Cl.

| | |
|---|---|
| ***F21V 23/04*** | (2006.01) |
| ***F21S 6/00*** | (2006.01) |
| ***F21V 21/28*** | (2006.01) |
| *F21W 107/20* | (2018.01) |
| *F21Y 113/10* | (2016.01) |
| *F21Y 115/10* | (2016.01) |

(52) U.S. Cl.
CPC .............. *F21V 23/04* (2013.01); *F21S 6/003* (2013.01); *F21V 21/28* (2013.01); *F21W 2107/20* (2018.01); *F21Y 2113/10* (2016.08); *F21Y 2115/10* (2016.08)

(58) Field of Classification Search
CPC ........... F21V 23/04; F21V 21/28; F21S 6/003
See application file for complete search history.

(56) References Cited

U.S. PATENT DOCUMENTS

| | | | | |
|---|---|---|---|---|
| 10,378,706 | B1 * | 8/2019 | Chen | F21V 21/34 |
| 2007/0290621 | A1 * | 12/2007 | Clark | F21V 29/74 315/112 |
| 2008/0291673 | A1 * | 11/2008 | Chen | F21S 6/003 362/231 |
| 2016/0334069 | A1 * | 11/2016 | Ji | F21V 17/02 |
| 2017/0171943 | A1 * | 6/2017 | Möller | H05B 47/13 |
| 2018/0073712 | A1 * | 3/2018 | Baaijens | F21V 9/20 |
| 2018/0077767 | A1 * | 3/2018 | Soler | H05B 45/20 |
| 2022/0225487 | A1 * | 7/2022 | De Best | H05B 47/155 |

* cited by examiner

*Primary Examiner* — Christopher E Dunay
(74) *Attorney, Agent, or Firm* — Murtha Cullina LLP

(57) ABSTRACT

The invention relates to a task light apparatus for use in low light or low glare environments in all types of working environments including air traffic control towers and vehicles such as seagoing vessels, aircraft or land vehicles. The task lighting apparatus uses LEDs and has multiple, independently dimmable wash and spot light modes. The task lighting apparatus has a fully adjustable and balanced arm that allows the light head of the apparatus to be adjusted to a variety of positions while maintaining the light head's horizontal orientation to ensure light emitted from the light head is only emitted in a vertical downward direction.

11 Claims, 6 Drawing Sheets

TASK LIGHTING APPARATUS

The invention relates to a task lighting apparatus for use in low light environments to reduce glare and prevent reflections in windows in all types of vehicles such as seagoing vessels, aircraft or land vehicles and rooms surrounded by large windows providing panoramic views, such as an air traffic control tower.

BACKGROUND

During operations of sea-going vessels, there are often times on the bridge of the vessel that it is desired or necessary to maintain a low light environment for proper operation or (stealth) protection of the vessel. Controlling the light level on the bridge of a vessel is essential to enable proper visualization of display(s) or needed when the vessel is operating in a stealth mode whereby all light emitted from light sources on the vessel are minimized protecting clandestine or secure operations. For example, there are many light sources on the bridge of a vessel that are necessary, as well critical for the proper and safe operation of the ship, such as an Uninterruptible Power Supply (UPS), Ground Detect Panel, Automatic Bus Transfer Switch (ABT), Critical Ships Displays, Global Positioning Systems (GPS), Navigation Aids, and other mission sensitive equipment. Light sources on the bridge of the vessel can also include task lighting fixtures such as those need to review maps or other operational materials on work surfaces on the bridge. Many vessel bridges have existing fixed light fixtures, but those light fixtures can cause substantial light pollution or when dimmed have too low an intensity and are insufficient for the required tasks. Often these light fixtures need to be supplemented with portable task lights, such as handheld flashlights, which are among the major light pollution offenders on a vessel's bridge as well as reducing an operators dexterity to perform necessary functions. Although red wavelength lighting is sometimes used on seagoing vessels, such lights are typically much too bright and produce significant "spill" that interferes with night vision.

Many types of vehicles and transports often have the need to operate in low light environments, including Navy, Coast Guard and merchant sea-going vessels, military vehicles such as tanks, personnel carriers and other armored vehicles, law enforcement and first responder vehicles, search and rescue vehicles and military and commercial aircraft. Task lighting apparatus in these vehicles and transports also need to be able to function after being subjected to vibrations, repeated impact loads and other stress loads that can result from external forces such as extreme operational environments, evasion tactics, waves at sea, explosion or rough terrain. In many situations the existing light fixtures on seagoing vessels have insufficient mounts and are inoperable because the fixture has failed after being subjected to such external forces and impact loads. The light fixture mounts of sea-going vessels often times are unable to withstand the moment arm forces or impact forces induced by wave motion encountered by the ship. Similarly, turbulence, rough terrain, explosions, or other external forces can impact aircraft and land vehicles and their critical lighting fixtures and lighting mounts.

If the light being scattered by fixed tasked lighting and portable task lights in the vehicles is not mitigated, controlled, and managed it can lead to some visual displays necessary for navigation or other mission critical activities not being visible due to washout from other brighter or distracting light sources. However, blocking or reducing too much light being emitted from these task light sources reduces visibility and utility of the light source. If the light being distributed from these light sources is not mitigated and controlled, it can also lead to mishaps and an unsafe environment on the bridge. On United States (US) government vehicles, there are governing regulations that require compliance with certain design criteria such as MIL-STD-1472H, "*DoD Design Criteria Standard for Human Engineering*," in particular the requirements of Subsection 5.18 addressing Controls, Displays, and Lighting in Ship Bridge Design.

Task lighting on the bridge is used during all phases of operation of the vessel but its use can often cause light scattering that makes recognition of other visual displays or physical structures on the vessel or in the vehicle difficult or impossible to see. Existing bridge task lighting on vessels is often based on fluorescent sources that have shorter life span and can be subject to damage due to the physical shocks experienced by vessels at sea.

When using existing styles of task lights scattering of light is widespread and uncontrolled due to the inherent design features of each task light which can cause or introduce significant issues to operators who in many cases are multitasking during various ship evolutions. Having a lighting fixture design with the ability to control the light dispersion by controlling the direction, intensity and volume of light being dispersed would be very advantageous to those working on the bridge of a vessel and to the overall safety of the ship. What is required is a way to narrow the focus and direction of the light being used and to limit and control the light's intensity. Additionally, task lighting on vessels also needs to be stable, maintain its orientation, have minimal light side scattering, and be designed to meet MIL-STD-901 Shock requirements to ensure safety of operators in certain operational environments that may cause projectile hazards or damage to mounted or freestanding equipment. The solution to the problem is a task lighting apparatus with a light head that is non-light-scattering, variable controlled and downward facing.

BRIEF SUMMARY OF THE INVENTION

The invention relates to a task lighting apparatus for use in low light environments in all types of vehicles such as seagoing vessels, aircraft, land vehicles, or rooms surrounded by large windows providing panoramic views, such as an air traffic control tower. The task lighting apparatus uses Light Emitting Diodes (LEDs) and has multiple, independently dimmable wash and hot spot light modes. The lighting apparatus has a fully adjustable and balanced arm that allows the light head of the apparatus to be adjusted to a variety of positions while maintaining the light head's horizontal orientation to ensure light emitted from the light head is only emitted in a vertical downward direction as required and positioned by the individual operator. The invention also has multiple light controls and dimming capabilities with a multiplex controller for controlling the intensity and dispersion pattern of the lighting apparatus.

The invention is a task light apparatus comprising: a mounting base configured for fastening to a flat surface; a mounting pipe having a first end and a second end, said first end connected to the mounting base; a mounting arm having a first end and a second end, the first mounting arm end connected to the mounting pipe between the first mounting pipe end and the second mounting pipe end; a lighting head connected the second mounting arm end, the lighting head comprising a housing, a Printed Circuit Board (PCB) with a LED matrix, a LED mounting pad, a controller and a first switch and a second switch; the housing defining a cavity in which the printed circuit board, the LED mounting pad, and the controller are all located and electronically connected, the LED matrix having a plurality of LEDs for a wash light and spot LEDs for a spot light; the controller being electronically connected to the red LED matrix and the first switch and the second switch and configured to control the electrical current being sent to the LED matrix; the first switch connected to the controller configured for signaling the controller to turn on the wash light and also being configured for signaling the controller to adjust the intensity of the wash light; the second switch connected to the controller configured for signaling the controller to turn on the spot light and also being configured for signaling the controller to adjust the intensity of the spot light; and, the mounting base, mounting pipe, mounting arm and lighting head being covered by a glare reducing black powdered coating.

The invention includes the ability to use a focused "hot spot" for reading and other detail work when in a vehicle or ship bridge to significantly reduce and eliminate the need for those working inside the vehicle or on the bridge of the vessel to use handheld flashlights, separate reading lamps or other non-traditional light sources.

The inventive light apparatus has smooth and intuitive dimming capabilities and easy tactile operation; the first switch for controlling the wash light is larger than the second switch which controls the spot light. The light apparatus has a low visibility to sailors on the bridge and has a solid-state, shock resistant, LED matrix with multiple source redundancies (10:1) and a vastly improved beam pattern over standard lighting fixtures. The inventive apparatus has a ruggedized mount that can accommodate the high shock environment of an active surface ship while properly stabilizing the light apparatus head during all or most sea going operations. The apparatus incorporates redundant safety features to reduce the risk of electrical shock or parts separation that could create projectile hazards on the bridge during heavy seas and provide a combination of two forms of light sources providing a table surface "wash" mode and a narrow "hot spot" mode that can be used individually or in combination. The inventive light apparatus is designed and configured to successfully pass MIL-STD-901 shock testing as previously demonstrated and documented.

DETAILED DESCRIPTION OF THE INVENTION

Figure 1A:
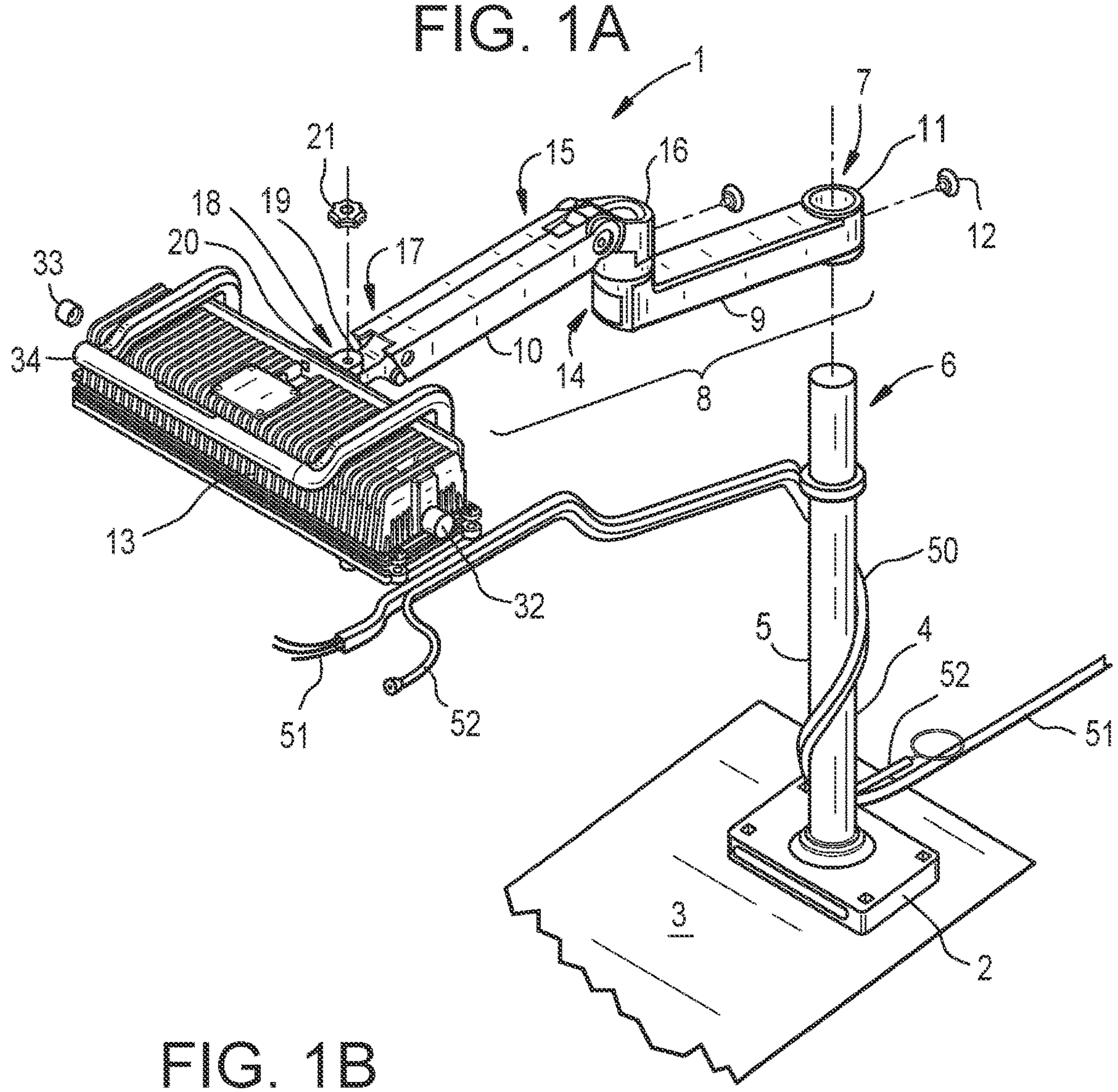
FIG. 1A illustrates an exploded front perspective view of a partially assembled light apparatus of the invention.
Figure 1B:
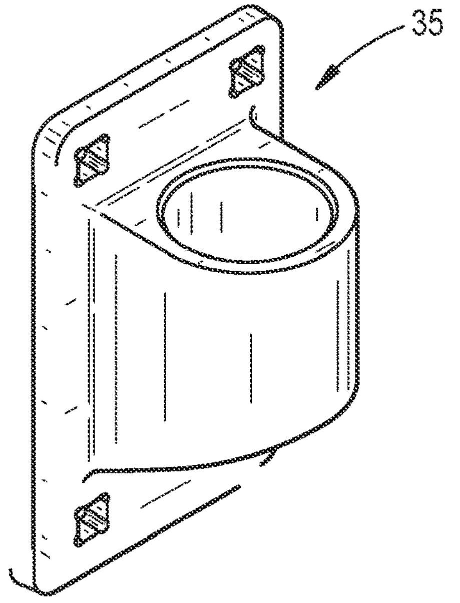
FIG. 1B illustrates a bulkhead mounting base.

FIG. 1A. Illustrates one embodiment of the task lighting apparatus 1. The task light apparatus has a mounting base 2 configured for fastening to a flat horizontal surface 3 such as a tabletop or work surface. Other types of mounting bases 2, as shown in FIG. 1B, could also be used such as a bulkhead mounting base 35 for mounting on a flat vertical surface of a bulkhead or sidewall of a vehicle. Mounted to and extending vertically from the mounting base 2 is a mounting pipe 4. The mounting pipe 4 is mounted in a vertical orientation relative to the bottom or floor of the vehicle. For example, the pipe 4 is mounted vertically relative to the deck or floor of a ship's bridge. The mounting pipe 4 lower end 5 is connected to the mounting base 2 while the upper end 6 of the mounting pipe 4 is connected to the first or proximal end 7 of a mounting arm 8. The proximal end 7 of the mounting arm 8 can be connected anywhere along the length of the mounting pipe but preferably near the upper end of the mounting pipe 4. The mounting arm 8 is made up of two primary portions a first horizontally portion 9 and a second vertically adjustable portion 10. The horizontal portion 9 is connected to the mounting pipe 4 with a collar 11 that fits around the pipe 4 and can be rotated around the pipe before is locked in place with an adjustable knob 12. The horizontal portion 9 allows the light head 13 of the light apparatus 1 to be adjusted in a horizontal plane parallel to the tabletop 3 or work surface, such that the light cannot shine onto any windows or into a person's eyes. It is then locked in place with an adjustable knob. The horizontal portion 9 has a distal end 14 that is connected to a second vertically adjustable portion or vertical portion 10 which is a spring arm. The spring arm 10 uses a spring, rather than gas struts or Hazmat, to dampen movement of the arm and head, providing apparatus stability in heavy sea conditions or otherwise turbulent motion. The distal end of the horizontal 9 portion is connected to the proximal end 15 of the vertical portion 10 with a rotatable joint 16 or arm base that permits the vertically adjustable portion 10 to rotate horizontally and move vertically relative to the horizontal portion's distal end 14. The vertical portion 10 has a distal end 17 to which the light head 13 of the lighting apparatus 1 is connected.

Figure 2:
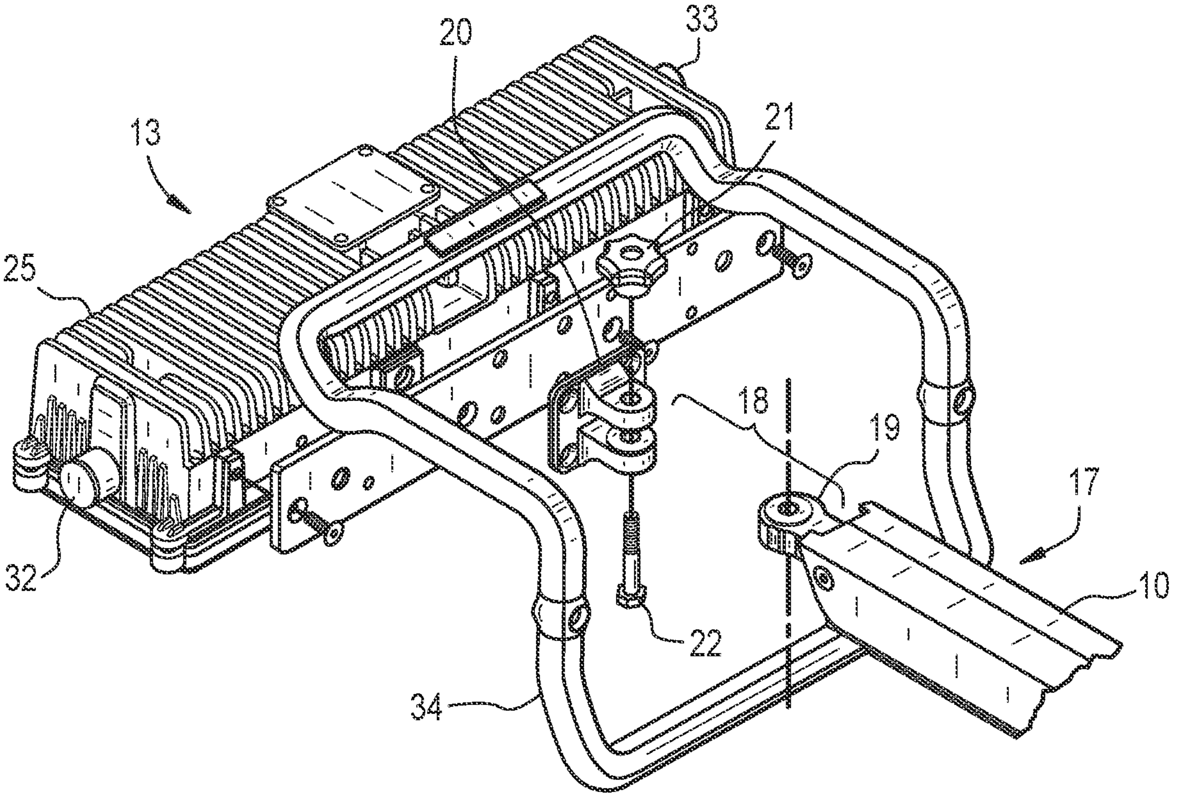
FIG. 2 illustrates an exploded rear perspective view of the light head and its connection to the distal end of the spring arm.

FIG. 2. is a rear perspective and exploded view of the vertical adjustable portion 10 of a partial mounting arm 8 connected to the light head 13 of the light apparatus 1. Extending from the distal end 17 of the vertical adjustable portion 10 is a disc connector 19 which slides into a head mount connector 20 and is held together by a knob 21 and screw bolt 22 to form a connecting joint 18. The connecting joint arrangement permits the light head 13 to only rotate around a single axis that coincides with the axis of the screw bolt 22, in a single perpendicular plane relative to the mounting pipe 4, regardless of the position of the light head 13 relative to the mounting bracket 2. The connecting joint 18 can be adjusted with an adjustable knob 21. As shown in FIG. 1A, the mounting arm's 8 combination of horizontal portion 9 and vertical portion 10, the rotatable joint 16 and the connecting joint 18 allow the light head 13 to be freely movable and adjustable by the user to an infinite number of heights and positions relative to the mounting base 2 while always maintaining the lighting head 13 in a horizontal plane that is perpendicular to the mounting pipe 4 and parallel to the rotatable joint 16 or arm base.

A task lighting apparatus that operates in dark environments also needs controls and handles that can be easily identified by manual means when the user is in the dark or very low light conditions. The light head 13 of the light apparatus has a handle 34 that is attached to the back of the light head 13 and extends up, over and around to the front top of the light head 13 for substantially the length and width of the light head 13. The handle 34 also extends horizontal beyond the front edge of the light head 13 to allow the handle 34 to be gripped by a user from the front of the light head 13. The handle also extends behind the back of the light head 13 and extends down below the bottom of the lower surface of the light head 34. The part of the handle extending below the apparatus head also extends substantially the length of the light head 34. The extension of the handle 34 along the width of the head allows the user or operator to easily find and grasp the handle 34 when operating in a dark environment and when the operator's vision is focused on the work surface 3 below the task lighting apparatus 1 allowing the user operator to adjust the light head 13 position without having the light head 13 in their field of vision.

Figure 3:
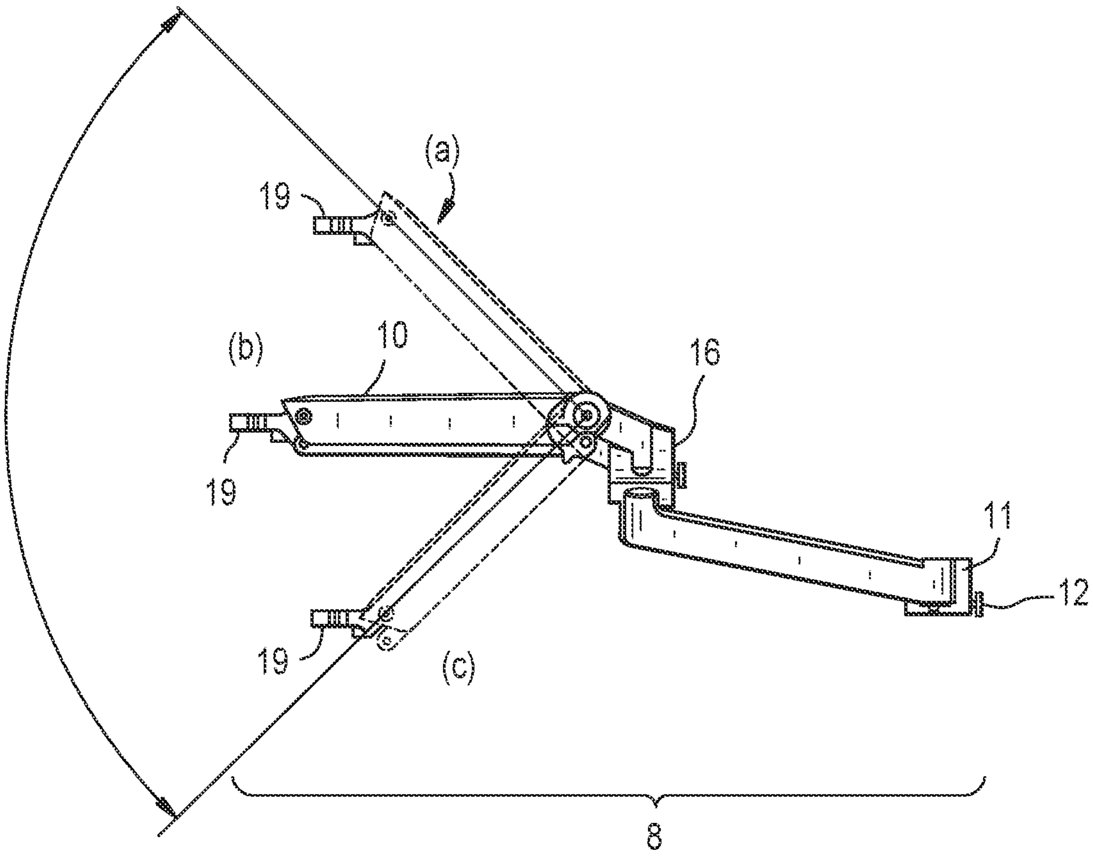
FIG. 3 illustrates a side view of parts of the mounting arm of the invention showing various adjustment positions of the mounting arm.

FIG. 3. Depicts the mounting arm 8 with the vertical portion 10 in three different vertical positions, in an upper position (a), an intermediate position (b) and a lower position (c). The figure illustrates how the disc connector 19 maintains its horizontal position parallel to the rotatable base 16 regardless of the adjusted angle of the vertical portion 10. Comparing mounting arm 8 positions (a), (b) and (c), the disc connector 19 maintains its orientation in a parallel horizontal plane regardless of the positioning or angle of the vertical portion 10.

The light head 13 and mounting arm 8 components need to be balanced by adjusting the spring in the spring arm 10 to prevent the position of the light head 13 changing over time relative to the base 2. If the light head 13 and mounting arm 8 of the lighting apparatus 1 are not balanced when the lighting apparatus is on a moving vessel or vehicle that is subject to vibrations, the vibrations, over time, will cause the light head 13 to move in response to those vibrations and to change position to an extreme position. For example, an unbalanced light fixture will over time, as a result of wave action which can cause a ship to heave, sway, surge, roll, pitch, and yaw, move from its original position to a different position and the light head will ultimately end up in a completely upper or lower position relative to the mounting plate. As previously identified, adjustable knobs 12 can be used to lock the task light into place, both vertically and horizontally.

Figure 4:
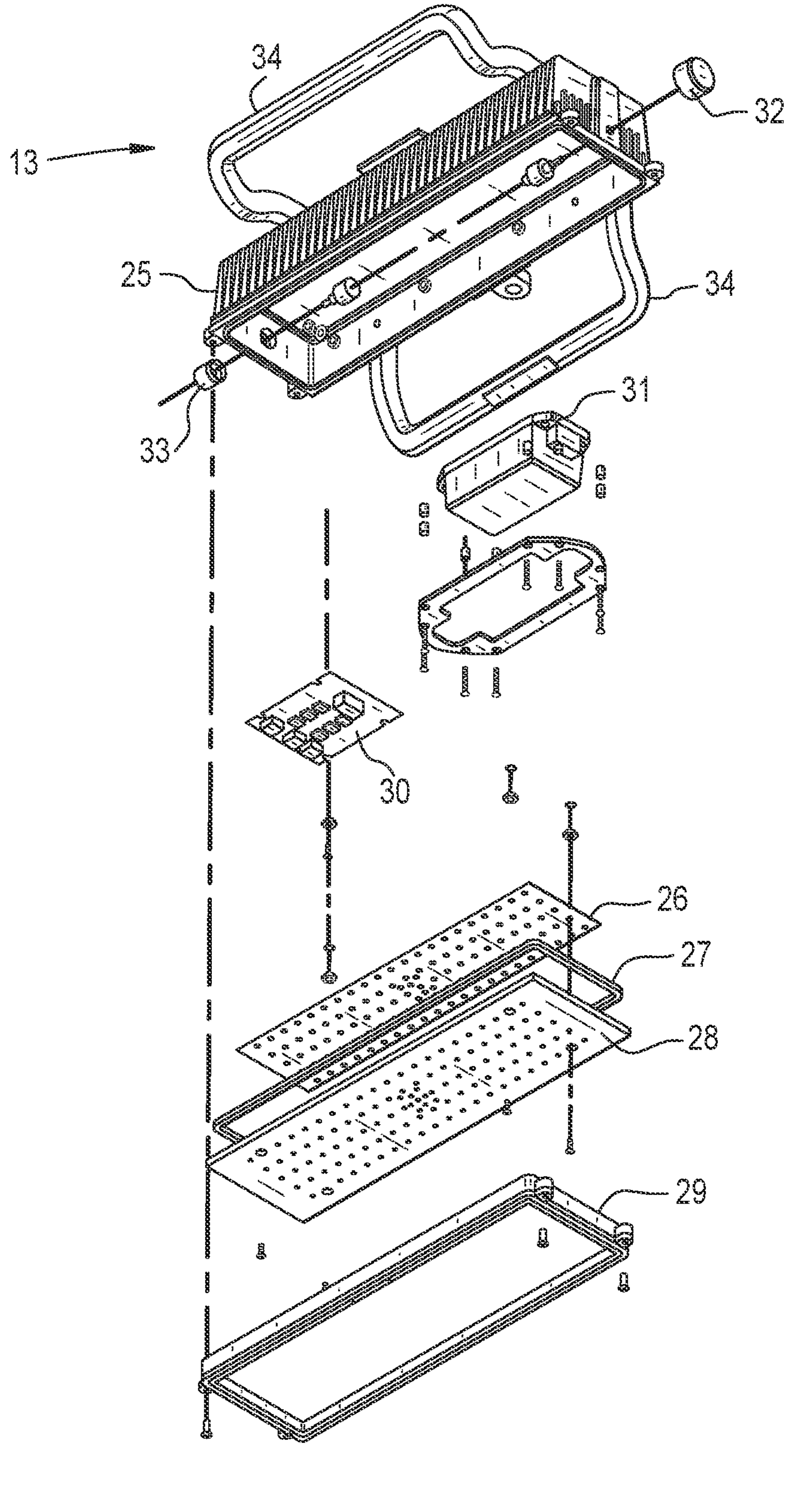
FIG. 4 illustrates an exploded lower perspective view of the components of the light head of the light apparatus.

FIG. 4. is a lower perspective and exploded view of the components of the light head 13 of the task light apparatus 1. The lighting head is comprised of a light housing 25, a printed circuit board with a LED matrix 26, a gasket, 27, a LED mounting pad 28 with multiple openings for LED's from the LED matrix 26, a holding plate 29, a controller 30 and power source 31, first lighting knob switch 32, a second lighting knob switch 33 and a handle 34.

The light housing 25 defines a cavity in which the printed circuit board 26, the gasket 27 the LED mounting pad 28, and the controller 30 and power source 31 are all located, and the electrical components are electronically connected. The holding plate 29, first lighting knob switch 32, the second lighting knob switch 33 and the handle 34 are attached to the exterior of the light head 13. The light housing 25 and light head 13 are sealed with no openings or spaces between components that would permit ambient light from the LEDs to leak from the light housing 25 or light head 13. Sealing the light housing 25 to eliminate light leakage openings is required to completely minimize and eliminate any light scattering, side light spillage or any other unnecessary or distracting light from emanating from the light housing 24 or light head 13.

During initial testing of the invention an LED light with a single-color red matrix was used with a control of the beam spread and brightness. The initial LED mounting pad 28 used did not sufficiently control the spread and diffusion of the light spill emanating from the light head. Accordingly, the thickness of the mounting pad 28 was adjusted to minimize the light spill by controlling the light beam direction and spread. When the LED matrix 26 is assembled in the lighting head 13 the LEDs are positioned within the openings of the LED mounting pad 28 and the LEDs are recessed from the outer bottom surface of the LED mounting pad 28.

If the LED mounting pad 28 is too thin, then the LEDs in the mounting pad holes extend too far into the LED mounting pad 28 and are not sufficiently shielded resulting in too much light being spilled or scattered into the surrounding environment. If the LED mounting pad 28 is too thick then LEDs in the mounting pad holes are overly shielded and the intensity and dispersion of the light is too greatly reduced thus reducing the brightness and effectiveness of the lighting apparatus 1 as a light source. The inventors found that a mounting pad 28 of a thickness between of 0.205 inches+/−0.005 inches allowed for the circuit card and LEDs to be in a position to provide optimal light spread while also hiding any undesirable direct visible light from be emitted by the LED.

Use of a LED matrix 26 using a large plurality of LEDs can improve the light output redundancy or more than 10 to 1 over the existing prior art light fixtures that use only a single bulb or LED. Under prior art fixtures using only one or two bulbs should one of the bulbs fail the light fixture will lose all or substantially all its ability to emit light and operate as a lighting fixture. Under the invention should one LED fail, the numerous other LEDs continue to operate meaning the overall operating light intensity of the apparatus is only minimally affected. The LED light source has multiple redundancies versus prior art two-lamp fluorescent fixtures with a ballast. Use of the LED source improves the prior art lifespan of 7,000 to 15,000 hours using a solid-state chip which increases the lifespan to 50,000 to 100,000 or more hours.

The task light apparatus 1 includes a focused "hot spot" for reading and other detail work reducing the need for handheld flashlights in the task area and avoids the need for additional separate reading lamps in the task area. While red LEDs can be used due to their compatibility with low light environments, the invention also can use green LEDs in the task lighting apparatus 1. Use of green LEDs would be compatible with use of night vision goggles by sailors on the bridge or control tower of a vessel.

The invention includes a light head with LEDs configured to project multiple fully dimmable light patterns. One type of projected pattern, or mode, is commonly referred to as a wide, flood or wash light. A second type of projected pattern, or mode, is commonly referred to as narrow, spot or hot spot light. The inventive design includes light features, or modes, such as a fully dimmable red lighting wash with a separately controlled, fully dimmable red hot spot. Both the wash and hot spot can be used either individually or simultaneously at varying intensities. A LED mounting pad 28 and LED board 26 which provide not only the matrix to create the required lighting, but are also configured to permit only minimal or no light bleed due to the narrow dispersion the LEDs.

Figure 5A:
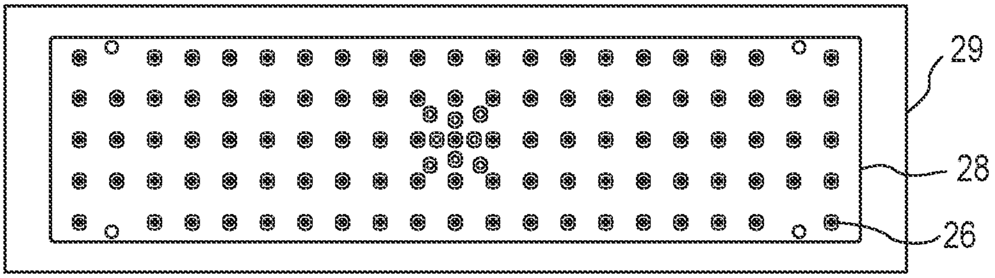
FIGS. 5A, 5B, 5C and 5D illustrate the LED matrix and mounting pad with some of the LED display patterns that are possible with the invention.

FIGS. 5A, 5B, 5C and 5D illustrate the LED matrix 26 and LED mounting pad 28 with some of the LED light display patterns and optional lighting modes possible with the invention. The circuit board with LED matrix 26 has a plurality of LEDs that can be controlled and activated for the light head 13 to emit both a wash light and independent spot LEDs for a spotlighting effect. In one embodiment the LED Matrix 26 has five rows with approximately 21 LEDs evenly spaced in each row. When the apparatus is used in wash or flood mode the LEDs in all five rows are illuminated. FIG. 5A shows the lighting pattern for a typical wash mode with the darkened LEDs indicating emitted light. The apparatus could also be modified in other embodiments to use less than all five rows when in a wash lighting mode. The wash lighting LEDs are controlled and dimmable with a dedicated knob 32.

Figure 5B:
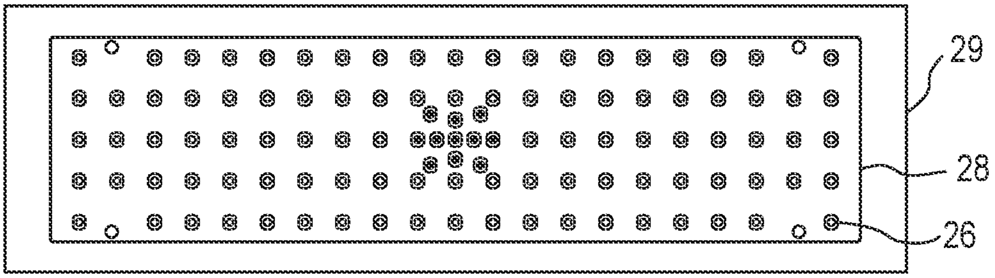

As seen in FIG. 5B, in addition to the five rows, the matrix 26 also has additional spot LEDs located near the center of the matrix for use as spot lighting. The spot LED's are shown as the darkened LED's in the figure. Some of these spot LEDs are positioned in between the matrix rows. In one embodiment the eleven spot LEDs are positioned in a star pattern as shown in FIG. 5B. These spot LEDs are independently controlled and dimmable by a separate dedicated second knob 33 and when the lighting apparatus 1 is in complete spot lighting mode only these spot LEDs are illuminated. The number and position of the LEDs that make up the spotlight can be modified to best suit the different applications in which the task lighting apparatus might be used.

Figure 5C:
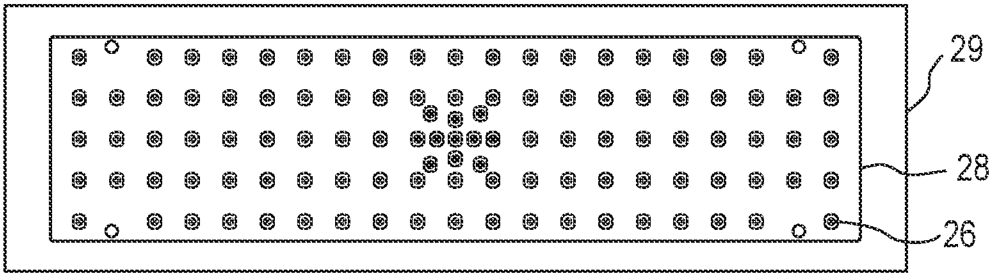
Figure 5D:
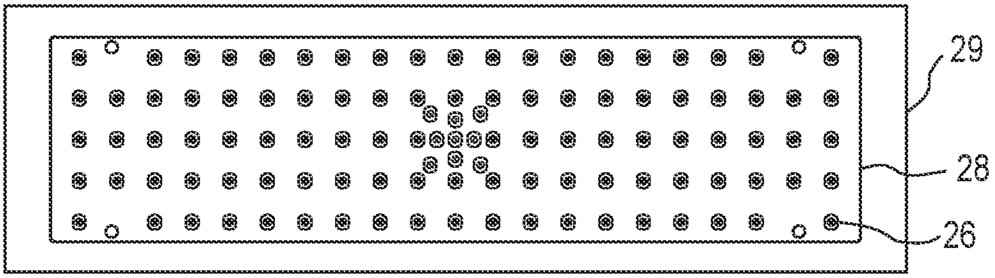

While both the wash light mode LEDs and spot mode LEDs are independently controlled both sets of LEDs can be illuminated at the same time as shown in FIG. 5C. Controlling the intensity of the illumination and the dimming of both the wash and spot LEDs is independently controlled and adjustable which allows for independent dimming of the wash and spotlight to be finetuned by the user for the particular work task at hand. In FIG. 5C, both the spot LEDs and wash LEDs are illuminated but the spot LEDs are illustrated with a higher intensity with darker LEDs than the wash LEDs which are illustrated with less intensity with lighter colored LED because they have been substantially dimmed relative to the spot LEDs. The light controls also permit the alternative arrangement with the spot LEDs being dimmed relative to the higher intensity wash LEDs as shown in FIG. 5D. The controller 31 is electronically connected to the LED matrix 26 and electronically connected to the first switch 32 and the second switch 33 and configured to control the electrical current being supplied to the LEDs in the LED matrix.

The first switch 32 is electrically connected to the controller 31 and configured for signaling to the controller 31 when to turn on and off the wash light LEDs. The first switch 32 is rotatable and is connected to the controller 31 to allow the dimming and intensity of the wash LEDs to be adjusted by the controller 31 based upon rotation of the first switch 32. The combination of the first switch 32 and controller 31 permits the control and operation of the wash light dimming feature. The second switch 33 is electrically connected to the controller 31 and configured for signaling to the controller 31 when to turn on and off the spot light LEDs. The second switch 33 is rotatable and is connected to the controller 31 to allow the intensity of the spot LEDs to be adjusted by the controller 31 based upon rotation of the switch 33. The combination of the second switch 33 and controller 31 permits operation of the spotlight dimming feature.

In one embodiment of the invention the task lighting apparatus has light control knobs of different sizes located at opposite sides of the light head. One knob is for activating and controlling the intensity of the spotlight feature in the lighting head and one is for activating and controlling the intensity of the wash light feature in the lighting head. The different size knobs on the device allow the operator to use tactile feedback to intuitively know which light feature the operator is about to activate before adjusting the knob. This is particularly helpful in dark environments and when the operator's vision is focused on the work top area below the light head and does not have the light head in their field of vision. One embodiment of the invention the larger knob 32 activates the wash light feature and the smaller knob 33 operates the spot light feature.

The device also includes a controller 30 with inventive circuitry that provides more efficient power management, using a switching AC/DC converter, of the energy required to operate LEDs and to provide the secondary, dimmable and controllable "hot spot" for focused task lighting. The controller 30 is designed in a manner such that the LED board can be easily detached from it. The controller 30 has an integrated heat sink to the light housing 25.

In another embodiment of the invention, the wash light mode activates five rows of LEDs such that each row is fully dimmable from 0.17 to 100 lux per row of LEDs. The invention also includes a hot spot for a hot spot light mode of 100 lux at max. The hot spot light is used for reading and other detail work, instead of using a separate dedicated light such as flashlight. The hot spot is a dense cluster of LEDs with a narrower beam allowing for maximum light with minimal dispersion.

The inventive lighting apparatus is superior to task lights that use standard florescent or non-LED light bulbs that are covered with a red film like those often used on the bridges of ships. Frequently, the intensity of lighting using red film or fixtures is not sufficient to meet the necessary performance standards. The inventive apparatus using LEDs meets the applicable Navy standards MIL-DTL-16377J and MIL-F-16377J/16A specification sheet requirements and, withstands the required qualification testing for certification and installation on board Navy ships. The invention also meets the shock testing standards in accordance with MIL-DTL-901E and MIL-S-901 and meets vibration standards in accordance with MIL-STD-167-1 and -1A.

To further improve the low light features of the invention the task lighting apparatus 1 includes arm sections and other components that are finished with a black polymer ceramic powder coating such as cerakote applied to the machined parts and applied to visible connectors in order to reduce glare from other equipment. The machined parts that can be coated include the LED mounting pad 28, the light head housing 25, the mount 2, the mounting pipe 4, the mounting arm 8, the connecting joint components 18, such as the disc connector 19 and head mounting connector 20.

Figure 6:
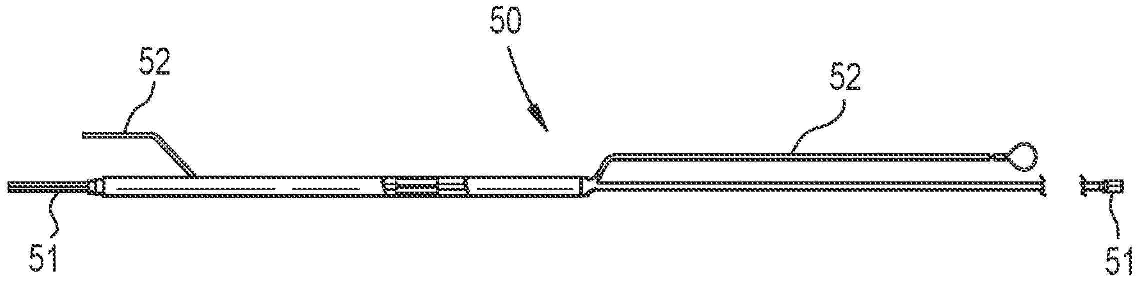
FIG. 6 depicts a cut away of the power cable assembly.

FIG. 6 illustrates a power cable assembly 50 which is an added safety feature of the task light apparatus 1. As designed the power cable 50 enables parts retention in the event of a high load shock event that fractures the lighting apparatus components. The power cable assembly 50 includes a power cord 51 that can be a shielded low smoke, zero halogen power cable combined with a safety cable 52. The safety cable 52 can be fixedly attached to the vehicle while the power cord 51 can be plugged into a standard electrical outlet.

Although specific advantages of the invention have been enumerated above, various embodiments may include some, none, or all of the enumerated advantages. Other technical advantages may become readily apparent to one of ordinary skill after review of the figures and description. Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described herein.

What is claimed is:

1. A task light apparatus comprising:
a mounting base configured for fastening to a flat surface;
a mounting pipe having a first end and a second end, said first end connected to the mounting base;
a mounting arm having a first end and a second end, the first mounting arm end connected to the mounting pipe between the first mounting pipe end and the second mounting pipe end;
the mounting arm has two sections, one of which is a vertical portion that is a spring arm;
a lighting head connected the second mounting arm end, the lighting head comprising a housing, a printed circuit board with a LED matrix, a LED mounting pad, a controller and a first solid state switch and a second solid state switch;
the housing defining a cavity in which the printed circuit board, the LED mounting pad, and the controller are all located and electronically connected,
the LED matrix having plurality of LEDs for a wash light and spot LEDs for a spot light;
the controller being electronically connected to the LED matrix and the first solid state switch and the second solid state switch and configured to control the electrical current being sent to the LED matrix;
the first solid state switch connected to the controller configured for signaling the controller to turn on the wash light and also being configured for signaling the controller to adjust the intensity of the wash light; and
the second solid state switch connected to the controller configured for signaling the controller to turn on the spot light and also being configured for signaling the controller to adjust the intensity of the spot light.

2. The task light apparatus of claim 1 wherein the LED matrix is a red LED matrix with red LEDs that meet the red wavelength requirements listed in MIL-DTL-16377.

3. The task light apparatus of claim 1 wherein the LED matrix is a green LED matrix with green LEDs that meet the green wavelength requirements listed in MIL-DTL-16377.

4. The task light apparatus of claim 1 wherein the mounting base, mounting pipe, mounting arm and lighting head are covered by a glare reducing black powdered coating.

5. The task light apparatus of claim 4 wherein the LED mounting pad is covered by a glare reducing black powdered coating.

6. The task light apparatus of claim 1 wherein the LED mounting pad has a thickness of between 0.210 inches and 0.200 inches.

7. The task light apparatus of claim 1 having a connecting joint between the lighting head and the vertical portion of the mounting arm configured to permit the light head to only rotate around a single axis in a single perpendicular plane relative to the mounting pipe.

8. The task light apparatus of claim 1 wherein the mounting base is a surface mount configured to mount on a flat horizontal surface.

9. The task light apparatus of claim 1 wherein the mounting base is a bulkhead mount configured to mount on a flat vertical surface.

10. The task light apparatus of claim 1 wherein the housing is sealed to eliminate LED light leakage from the housing.

11. A task light apparatus comprising:
a mounting base configured for fastening to a flat surface;
a mounting pipe having a first end and a second end, said first end connected to the mounting base;
a mounting arm having a first end and a second end, the first mounting arm end connected to the mounting pipe between the first mounting pipe end and the second mounting pipe end;
a lighting head connected the second mounting arm end, the lighting head comprising a housing,
a printed circuit board with a LED matrix, a LED mounting pad, a controller and a first solid state switch and a second solid state switch;
the housing defining a cavity in which the printed circuit board, the LED mounting pad, and the controller are all located and electronically connected,
the LED matrix having plurality of LEDs for a wash light and spot LEDs for a spot light;
the controller being electronically connected to the LED matrix and the first solid state switch and the second solid state switch and configured to control the electrical current being sent to the LED matrix;
the first solid state switch connected to the controller configured for signaling the controller to turn on the wash light and also being configured for signaling the controller to adjust the intensity of the wash light;
the second solid state switch connected to the controller configured for signaling the controller to turn on the spot light and also being configured for signaling the controller to adjust the intensity of the spot light; and
a safety cord comprising a power cord and a wire rope, the safety cord with two ends, the first end being attached to the lighting head and second end being fixedly attached to a machined mechanical attachment point or around a permanently fixed structure.

* * * * *